March 5, 1968
A. MARZOCCHI
3,371,548
BELTS AND OTHER GLASS FIBER-ELASTOMERIC STRUCTURES
AND METHOD OF MANUFACTURE
Original Filed Dec. 26, 1962
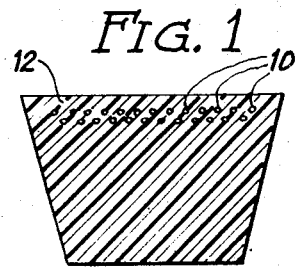
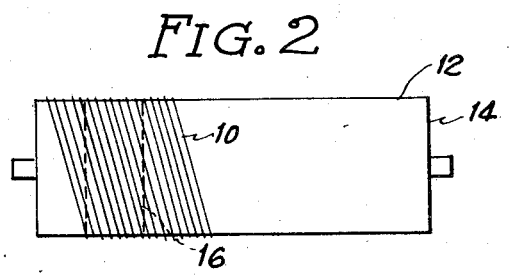
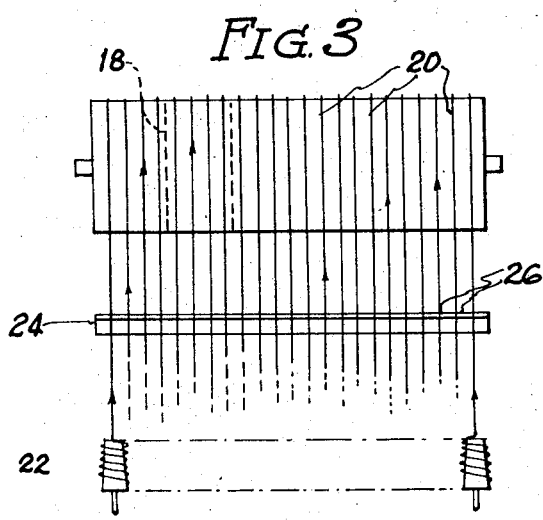
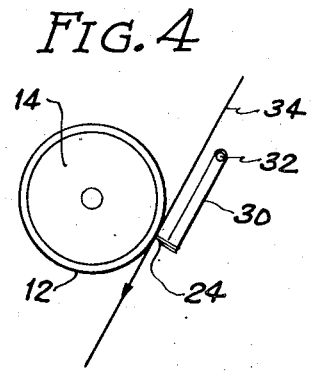
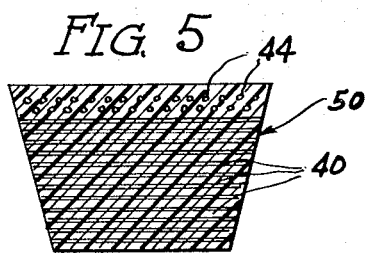
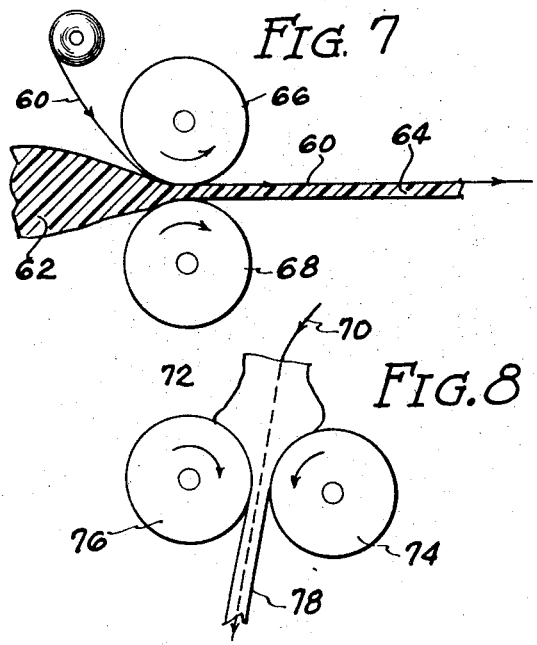
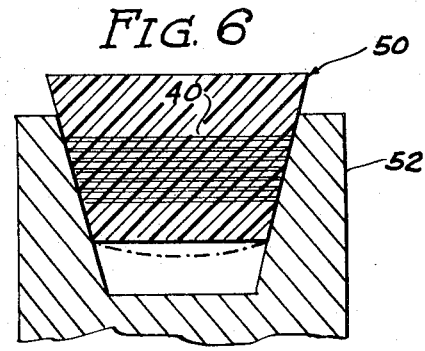
INVENTOR.
Alfred Marzocchi
BY
Attys 
United States Patent Office 3,371,548  
Patented Mar. 5, 1968

3,371,548  
BELTS AND OTHER GLASS FIBER-ELAS-  
TOMERIC STRUCTURES AND METHOD  
OF MANUFACTURE  
Alfred Marzocchi, Cumberland, R.I., assignor to Owens-Corning Fiberglas Corporation, a corporation of Delaware  
Original application Dec. 26, 1962, Ser. No. 247,244, now Patent No. 3,296,050, dated Jan. 3, 1967. Divided and this application July 14, 1966, Ser. No. 582,770  
3 Claims. (Cl. 74—234)

This is a division of Application Ser. No. 247,244, filed Dec. 26, 1962, now Patent No. 3,296,050.

This invention relates to elastomeric products which are reinforced with fibers of high strength and high dimensional stability, and relates more particularly to glass fiber-elastomeric products having new and improved physical and mechanical properties and to methods for the manufacture of same.

The concepts of this invention will be illustrated by reference to the manufacture of endless belts wherein the fibrous component comprises glass fibers and wherein the elastomeric component comprises a cured neoprene. It will be understood that the inventive concepts will have application to other structures fabricated or otherwise molded of elastomeric materials, and that instead of glass fibers, other fibers characterized by high strength and good dimensional stability, such as resistance to cold flow or deformation, may be used, and that, instead of neoprene, use can be made of other elastomeric materials such as butadiene polymers and copolymers of butadiene with styrene or acrylonitrile, chloroprene, isoprene, natural rubber, and the like.

In my copending application Ser. No. 218,724, filed Aug. 22, 1962, now Patent No. 3,287,204, entitled "Elastomeric-Glass Fiber Products and Process and Elements for Use in Same," description is made of the fabrication of an endless belt in which cords of glass fibers are arranged to extend unidirectionally lengthwise of the belt, preferably in the outer portions of the belt to increase the flexure strength of the belt; to increase the strength of the belt in tension; and to minimize the stretch of the belt whereby the resulting belt structure is characterized by dimensional stability in use. The foregoing improvements are derived when the longitudinally extending glass fiber cords are firmly and strongly integrated into the matrix of the cured elastomeric material forming the substantially continuous phase in which the glass fibers are embedded during the steps in fabrication of the belt, as described in the aforementioned copending application.

It is an object of this invention to produce and to provide a method for producing a fibrous elastomeric system of the type described, wherein fuller utilization is made of the physical and mechanical properties of the fibrous component incorporated into the elastomeric material in the manufacture of such glass fiber-elastomeric products; wherein the process of fabrication can be reduced to a mass production process which utilizes less labor, less equipment, and less materials without corresponding decrease in the properties of the fabricated product thereby to enable reduction in the cost thereof while increasing the rate of output; and wherein better control can be achieved in the arrangement and distribution of the fibrous component in the elastomeric product, and it is a related object to provide a new and improved means and method for the manufacture of same.

Another object of this invention is to produce a fibrous-elastomeric system of the type described which includes a modification in the arrangement of the fibrous component embodied within the substantially continuous phase of the elastomeric material, whereby further improvements are achieved in physical and mechanical properties of the formed elastomeric product, and it is a related object to provide a new and improved means and method for use in the fabrication of same.

These and other objects and advantages of this invention will hereinafter appear and for purposes of illustration, but not of limitation, embodiments of the invention are shown in the accompanying drawing, in which:

FIG. 1 is a sectional elevational view through a V-belt embodying the practice of this invention;

FIG. 2 is a schematic view illustrating the previous practice in the introduction of the fibrous cords for combination with the elastomeric material;

FIG. 3 is a view similar to that of FIG. 2 embodying the improvements of this invention;

FIG. 4 is a schematic sectional elevational view of a means for introducing the glass fiber cords for combination with the elastomeric material, in accordance with the practice of this invention;

FIG. 5 is a sectional elevational view of a V-belt prepared in accordance with the practice of this invention;

FIG. 6 is a sectional elevational view of a V-belt shown in position of use in a driven pulley;

FIG. 7 is a schematic elevational view illustrating one means for the incorporation of glass fibers into the elastomeric material for use in the practice of this invention; and FIG. 8 is a schematic view of a further means for the incorporation of fibers during the milling of the elastomeric material.

While the concepts of this invention are addressed chiefly to the arrangement of the fibrous component in the elastomeric product and to the method and means for achieving the same, it is still important to effect a strong and substantially permanent interconnection between the fibrous component and the elastomeric material in order to achieve fuller utilization of the properties intended to be derived from the fibrous component. This can be achieved in various ways, some of which form the subject matter of copending applications. For example, the desired interconnection between the fibrous component and the elastomeric component can be achieved by modification which provides for greater penetration of the elastomeric material into the strands, cords, or yarns of glass fibers during molding or processing to form the elastomeric product, reference being made to my copending application Ser. No. 234,750, filed Nov. 1, 1962, and entitled, "Treated Glass Fiber Bundles and Combinations Thereof With Elastomeric Material," wherein use is made of a polyfunctional compound such as ethylene dimethacrylate or divinyl benzene as a coating on the glass fibers or elastomeric material to increase the flow of the elastomeric material for greater penetration into the glass fiber structure and/or for interbonding with the materials with which the glass fibers are coated. A strong and permanent bonding relationship between the surfaces of the glass fibers and the elastomeric material can also be achieved by the use of the bonding agent or anchoring agent between the glass fibers and the elastomer, such as alkoxy, silyl alkyl amines, as described in the copending application Ser. No. 218,723, filed Aug. 22, 1962, now Patent No. 3,252,278, and entitled, "Elastomeric-Glass Fiber Products and Process and Elements for Use in Same," or such as the adhesive coating described in application Ser. No. 218,724, or such as the thio compounds, as described in application Ser. No. 234,852, filed Nov. 1, 1962, now abandoned and entitled "Glass Fiber-Elastomeric Systems and Elements."

With reference now to FIGS. 1 to 4 of the drawing, one of the concepts of this invention resides in the means and method by which the fibrous component is incorporated into the elastomeric system during manufacture of elastomeric product to make fuller utilization of the strength properties of the glass fibers. As described in the aforementioned copending application Ser. No. 218,-724, the glass fiber component is incorporated in the form of endless cords which are wound around the built-up layers of uncured elastomeric material which had been sheeted onto a mandrel. Such endless cords 10 of glass fibers are spirally wound on the cylindrical section 12 formed by the layers of elastomeric material as the mandrel 14 is rotated, while the cords 10 are fed from spindles through guides which shuttle back and forth axially alongside the mandrel. Such spiral winding of the cords about the cylindrical section of elastomeric material consumes a great deal of time and it requires substantial amounts of equipment and labor for proper control and feed of the cords during traverse of the mandrel, all of which militates against mass production and automation of the processing steps.

As will be seen from FIG. 2, the result is glass fiber cords 10 which are spirally wound about the built-up cylindrical section of the elastomeric material. When the composite layers are subsequently split circumferentially into sections, as indicated by the broken lines 16, for removal from the mandrel and subsequent flipping and molding to form the finished endless belt, it will be seen that the cords will extend angularly with respect to the length of the belt. It will also be seen that many of the cords will be severed and thus terminate in the side walls of the belt such that very few, if any, will extend continuously circumferentially through a completed loop about the belt.

In accordance with the practice of this invention, the endless strands, yarns, or cords of glass fibers are wound around the built-up layer or layers of uncured or elastomeric material in a non-spiral wind, and more preferably in a circumferential wind, with the fibers being looped more than one, and preferably about two, times circumferentially about the cylindrical section formed by the layers of elastomeric material built up on the mandrel to provide a plurality of circumferentially wound fibrous cords in closely spaced-apart parallel relation. A plurality of cords can be simultaneously fed in the desired laterally spaced-apart relation for concurrent winding about the built-up layers of uncured elastomeric material with the spaced relation between the cords depending upon the number and the spaced relationship between the cords in the feed.

As illustrated in FIG. 3, this provides an assembly on the mandrel in which the cords of glass fibers all extend unidirectionally, circumferentially about the cylindrical section of the elastomeric material so that when the assembly of elastomeric material and fibers are subsequently split, as along the broken lines 18 in FIG. 3, to subdivide the material into strips, substantially all of the fibers will extend circumferentially unidirectionally in the belt and substantially none of the fibers will be cut during the splitting operation, thereby to enable the length of the fibers in the assembly to remain intact. This not only results in increased strength by reason of the aligned fiber arrangement and greater fiber length extending continuously around the belt, but this arrangement also operates to increase the resistance to the stretch of the belt because of the lengthwise alignment of the glass fiber component and the characteristics of the glass fibers to resist stretch or to be free of cold flow. These characteristics are evidenced by the higher modulus of the resulting belt structure when the fibers extend continuously in the lengthwise direction. The described linear lengthwise arrangement of the glass fibers also provides conditions whereby the glass fibers can all come into play to take their corresponding share of any existing load and thereby to make fuller utilization of the strength properties of the composite of the glass fibers in the assembly.

Aside from the described marked improvement in strength, modulus, flexibility, and dimensional stability of the resulting belt or other elastomeric structure, the described arrangement is more amenable to automation and mass production techniques, markedly to reduce labor and cost while, at the same time, providing an improved product.

Parallel circumferential winding permits a plurality of ends to be fed simultaneously in the predetermined laterally spaced-apart relationship to permit introduction of the desired complement of glass fibers within but a few turns of the mandrel, depending upon the number of loops per end desired in the assembly.

As illustrated in FIGS. 3 and 4, the plurality of glass fiber cords 20 can be simultaneously fed from an equal number of spindles 22. The desired spaced relationship between the cords 20 fed from the spindles is maintained by a reed 24 aligned to extend axially in parallel relation with the mandrel and which is positioned adjacent the periphery thereof. The cords 20 are adapted to pass between the laterally spaced-apart teeth 26 on the reed and from the reed onto the periphery of the elastomeric layer on the mandrel.

Automation can be obtained by mounting the reed 24 on an arm 30 mounted for rocking movement about a shaft 32 between retracted position wherein the reed is spaced from the periphery of the mandrel 14 and operated position in which the reed is in contact with the layer 12 of the elastomeric material built up on the surface of the mandrel to bring the ends of the cords 34 into contact with the elastomeric material for application thereto.

The reed is provided with a cutting means, such as a shears of the reciprocating type used in a barber shears for cutting the ends of the cords and for holding the ends onto the reeds in anticipation of the next application. Instead, the reed may carry a cutting blade which is mounted for reciprocal movement between a retracted position and a cut-off position with means in the cut-off position for holding the ends of the cut fibers onto the reed and for releasing the fibers when the reed is displaced to operated position so that the fibers in the desired spaced relationship will again be taken up by the elastomeric material present as a layer on the periphery of the mandrel.

In operation, the uncured elastomeric material is built up to the desired thickness on the periphery of the mandrel and an adhesive is applied. While the mandrel is being rotated, the rocker arm 30 is displaced, as by means of a solenoid or other mechanical means to operated position to bring the ends of the cords held by the reed into contact with the elastomeric material while simultaneously releasing the cords for winding about the periphery of the elastomeric layer as the mandrel continues to rotate. The reed can return to retracted position but it is preferred to retain the reed in operated position to continue to press the cords into the periphery of the cylindrical section of the uncured elastomeric material as the mandrel is rotated. When one or more complete revolutions have been achieved, the shears are operated to sever the cords while the arm 30 is returned to retracted position. Thus one or more turns of glass fiber cords are circumferentially wound about the cylindrical section of the elastomeric layer built up on the surface of the mandrel. Such application of glass fiber cords can be repeated, if desired, with additional layers of uncured elastomer to provide for radially spaced-apart layers of such circumferentially wound laterally spaced-apart sections of glass fiber cords in the final product. When the desired build-up of glass fibers and uncured elastomer has been completed, the operations described in the aforementioned copending application can be completed including the slitting step, the flipping step and the molding step to form the final product, none of which steps form a part of this invention.

An important concept of this invention resides in the construction of a belt 50, with or without the longitudinally extending glass fiber cords wherein fibers of the type described are arranged to extend crosswise of the belt. A number of very significant improvements in the characteristics of the belt are derived from the presence of such crosswise extending fibers, whether or not longitudinally extending fibers are also embodied in the belt construction as heretofore described. Still other improvements of considerable value are derived in the specific combination which makes use of longitudinally extending fibers and crosswise extending fibers, as will hereinafter be set forth.

In the modification illustrated in FIG. 5, the crosswise extending fibers 40, in the form of fibers and preferably in the form of yarns, cords or strands, are in the portion of the belt 50 inwardly of the outer portion in which the longitudinally extending fibers 44 are located. All of the fibers are confined within the continuous matrix of the cured elastomeric material which may be fabricated in accordance with the teachings of the aforementioned copending application. In the modification illustrated in FIG. 5, the crosswise extending fibers 40 can be concentrated below the lengthwise extending fibers. They can be uniformly distributed throughout the underlying portion or they can be limited in their location to selected areas such as those portions adapted to be received within the sheave, as illustrated in FIG. 6, or to portions between the sheaves and portions underlying the longitudinally extending fibers, or limited only to the area underlying the longitudinally extending fibers.

In the modification illustrated in FIG. 6, the belt 50 is formed with fibers 40 extending only in the crosswise direction. In this arrangement, the crosswise extending fibers can be uniformly distributed throughout the cross-section of the belt or they can be confined to specific locations such as the inner portion of the belt adapted to be located between the sheaves 52, as illustrated in FIG. 6.

It has been found that the presence of the crosswise extending fibers in the belt construction operates to provide a belt which is characterized by greater resistance to compression, especially when measured in the crosswise direction, and more especially under the force conditions existing in V-belt operation. This is believed to result from the high dimensional stability of the glass fibers and their high tensile strength in their lengthwise direction coupled with the strong tie between the fibers and the cured elastomeric material whereby the fibers become effective to resist compression on the stretch in the crosswise direction of the belt.

It has also been found that belts formed of elastomeric material embodying fibers of the type described in the crosswise arrangement described can be formulated with elastomeric materials of greater resiliency than otherwise could be employed in belt construction. The ability to make use of elastomeric materials of greater resiliency coupled with glass fibers extending crosswise in the belt operates to produce a belt that is characterized by lower hystereses and lower modulus of elasticity. These improvements in belt construction and characteristics are believed also to result from the conditions existing, as described above.

The crosswise extending fibers operate also in the system described to produce a belt which runs cooler with corresponding increase in the life of the belt and its utility. Such increased coolness is believed to result from the ability of heat to travel along the fiber whereby the crosswise extending fibers are able to conduct heat from the interior of the belt to the surface portion thereby to produce a cooler running belt.

The crosswise extending glass fibers tend also to operate as bearings of the roller type in the assembly whereby the continuous rubber matrix is able to turn about the crosswise extending fibers as a pivot as the belt bends about the sheaves. This operates materially to increase the flexibility of the belt, especially when bent or turned about its horizontal crosswise axis.

The crosswise extending fibers operate in the system described to minimize distortion of the type which otherwise increases wear of the belt and decreases its efficiency in operation. For example, a belt of conventional construction tends to belly, as illustrated by the broken line in FIG. 6, under the force conditions existing in V-belt operation. Such bellying causes distortion through the remainder of the cross-section of the belt such that the grip between the belt and the sheaves is minimized. This decreases efficiency and it also operates to increase wear and decrease the useful life of the belt. With the crosswise extending fibers limited within the area between the confining side walls of the sheave, the fibers minimize side wall distortion and simultaneously minimize bellying of the type heretofore experienced.

Finally, the crosswise extending fibers, underlying the longitudinally extending fibers, will operate in the system described to support the longitudinally extending fibers in the assembly. Thus the longitudinally extending fibers are blocked by the crosswise extending fibers to prevent the former from being pulled down into the belt either during manufacture or in use of the belt. Such stabilization of the fibrous component serves to maintain the longitudinally extending fibers in that portion of the belt best served by such fibers to increase the modulus, to increase the dimensional stability, and to increase the flexibility of the belt while the crosswise extending fibers contribute the many additional characteristics and properties previously described.

It will be apparent that many of these improvements will be secured in other glass fiber-elastomeric systems, such as solid or pneumatic tires, rubber rollers and the like constructions, all of which are intended to be included within the concepts of this invention.

There are a number of ways in which the crosswise extending fibers can be incorporated into the cured elastomeric product.

One such technique is to make use of a mandrel of the type illustrated by the numeral 14 in FIGS. 2 and 3; cover the mandrel with a layer of elastomeric material in an uncured stage; circumferentially wind the glass fiber component about the cylindrical section of elastomeric material on the mandrel, as described in the initial portion of this application; slit the layer circumferentially in laterally spaced-apart relation as indicated by the broken lines in FIG. 3 to subdivide the cylindrical section into sections of lesser width; cut the section crosswise to produce a strip with the fibers extending unidirectionally therethrough; and then turning the strip through an angle of 90° when the strip is used as one of the layers applied on the mandrel, as described in the aforementioned copending application for belt fabrication. Such layers containing the crosswise extending fibers can be selectively located in the various layers that are built up on the mandrel before slitting, flipping and molding thereby selectively to locate the crosswise extending fibers in the final molded product.

One other means, illustrated in FIG. 7, is to introduce endless lengths 60 of fiber cords, yarns or strands in the desired concentration and in the desired laterally spaced-apart relation during the sheeting operation as the mass 62 of uncured elastomeric material is formed into a sheet 64 during passage between the spaced sheeting rollers 66 and 68. This places the fibrous component 60 in the surface portion, either the top and/or the bottom, of the sheet 64 with the fibers extending longitudinally in the sheet. The formed sheet with the fibers therein can then be subdivided crosswise into slabs which are used to build up one or more of the layers of elastomer on the mandrel prior to slitting, flipping and molding. The slabs are positioned with the unidirectionally extending fibers 60 extending axially of the mandrel so that they will extend crosswise in the belt or other products that are molded therefrom.

Instead of incorporating the fibrous component as unidirectional fibers embedded in the elastomeric material during the sheeting operation, the glass fiber component can be incorporated as unidirectional fibers during the milling operation. For this purpose, as illustrated in FIG. 8, the endless lengths of glass fibers 70, in the form of cords, yarns or strands, are fed in the desired lateral spaced-apart relation into the mass 72 of uncured elastomer at the bight of the milling rolls 74 and 76. The fibers will thus become embedded as unidirectional fibers in the sheet 78 that issues from between the rolls. The formed sheet can be handled as in the previously described sheeting process to locate the fibers as crosswise extending fibers in one or more of the layers built up on the mandrel for belt fabrication.

It will be apparent from the foregoing that I have provided a new and novel arrangement of fibers and elastomeric material in the manufacture of drive belts and other structures whereby the physical and mechanical properties of the molded product are greatly improved.

It will be understood that various changes may be made in the details of construction, arrangement and in the processing steps for the manufacture, without departing from the spirit of the invention, especially as defined in the following claims.

I claim:

1. A drive belt comprising the combination of a cured elastomeric material and a plurality of adjacent rows of glass fiber bundles each of which is formed of a plurality of glass fibers characterized by high strength and dimensional stability under the temperature and pressure conditions of use and wherein a strong tie-in exists between the fibers and the cured elastomeric material, said fibers being confined within the elastomeric material and arranged therein to extend substantially unidirectionally crosswise of the belt and in which the bundles of glass fibers are concentrated in the inner radial portion of the belt.

2. A drive belt as claimed in claim 1 in which the glass fibers have a coating of an anchoring agent to enhance the bonding relationship between the glass fiber surfaces and the cured elastomeric material.

3. A drive belt as claimed in claim 1 which includes bundles of glass fibers in the outer radial portion of the belt arranged to extend unidirectionally longitudinally of the belt and with the crosswise extending adjacent rows of glass fiber bundles located radially inward of the longitudinally extending bundles of glass fibers to support the latter in the desired position within the belt.

References Cited

UNITED STATES PATENTS

| | | | |
|---|---|---|---|
| 2,114,517 | 4/1938 | Apel et al. | 74—237 |
| 2,179,691 | 11/1939 | Freedlander | 74—233 |
| 2,356,249 | 8/1944 | Kremer et al. | 74—233 |
| 2,630,603 | 3/1953 | Freedlander et al. | 74—232 |
| 2,631,463 | 3/1953 | Waugh | 74—233 |
| 3,047,446 | 7/1962 | Henson | 74—232 X |
| 3,144,930 | 8/1964 | Michels | 74—237 X |

FOREIGN PATENTS

| | | |
|---|---|---|
| 482,774 | 4/1938 | Great Britain. |
| 874,956 | 8/1961 | Great Britain. |
| 1,050,821 | 9/1953 | France. |

FRED C. MATTERN, JR., *Primary Examiner.*

DAVID J. WILLIAMOWSKY, *Examiner.*

J. A. WONG, *Assistant Examiner.*